US005416896A

United States Patent [19]

Motoyama

[11] Patent Number: 5,416,896

[45] Date of Patent: May 16, 1995

[54] COMMAND DEFINITION DICTIONARY HANDLING AND CONTEXT DECLARATION IN A DOCUMENT PUBLISHING PAGE DESCRIPTION LANGUAGE (PDL)

[75] Inventor: Tetsuro Motoyama, San Jose, Calif.

[73] Assignees: Ricoh Company, Ltd., Tokyo, Japan; Ricoh Corporation, San Jose, Calif.

[21] Appl. No.: 931,808

[22] Filed: Aug. 11, 1992

Related U.S. Application Data

[63] Continuation-in-part of Ser. No. 876,601, Apr. 30, 1992, Pat. No. 5,319,748, and a continuation-in-part of Ser. No. 876,251, Apr. 30, 1992, Pat. No. 5,325,484.

[51] Int. Cl.[6] .............................................. G06F 17/22

[52] U.S. Cl. ..................................... 395/145; 395/148

[58] Field of Search ............... 395/109, 112, 114, 117, 395/145, 147, 148, 162; 358/452; 364/419.1, 419.11, 419.14, 419.17, 419.19

[56] References Cited

U.S. PATENT DOCUMENTS

| | | | |
|---|---|---|---|
| 4,949,188 | 8/1990 | Sato | 358/452 X |
| 4,970,665 | 11/1990 | Doi et al. | 395/148 |
| 5,023,811 | 6/1991 | Donnely et al. | 395/145 |
| 5,050,098 | 9/1991 | Brown, III et al. | 395/112 |
| 5,050,121 | 9/1991 | Vaughan | 395/275 |
| 5,113,355 | 5/1992 | Nomura | 395/109 |
| 5,133,051 | 7/1992 | Handley | 395/148 |
| 5,243,414 | 9/1993 | Dalrynple et al. | 358/500 |
| 5,243,518 | 9/1993 | Holt et al. | 364/419.1 |
| 5,247,372 | 9/1993 | Tsutamori et al. | 358/452 |
| 5,295,236 | 3/1994 | Bjorge et al. | 395/134 |

OTHER PUBLICATIONS

Dyson, Post Script Level 2: Unified and Extended, Seybold Report on Desktop Publishing, pp. 8 to 18 Mar. 4, 1991.

Tennent, Principles of Programming Languages, 1981, pp. 59 to 63, 150 to 153.

Simone, A Guide to Post Script for non-Postscript Programmers, PC Magazine, pp. 343–350 Apr. 30 1991.

Knuth, Art of Computer Programming, vol. 1 Fundamental Algorithms, 1973, pp. 234 to 238.

Seybold, A Post Script Backgrounder, Seybold Report on Desk Top Publishing, Mar. 4, 1991 p. 9.

Kinchin, Post Script: P.S. It's a Programming Language Too!, EXE, Jun. 1991, pp. 66 to 70.

ISO/IEC DIS 10180, Information Processing–Text Communication–Standard Page Description Language; Draft International Standard 1991–03, 1991.

"ISO/IEC 10180 Information technology—Text Communication—Standard Page Description Language (SPDL)", Dec. 30, 1993.

*Primary Examiner*—Heather R. Herndon

*Assistant Examiner*—Anton Fetting

*Attorney, Agent, or Firm*—Oblon, Spivak, McClelland, Maier & Neustadt

[57] ABSTRACT

An apparatus for controlling printing or display of documents represented in a structured hierarchal page description language. Documents are provided as a document data stream which can include references to dictionary generators which can be incorporated into the document by the content processor. Documents are defined by a prologue section which may contain definitions and declaratory commands, with content portions containing specific tokens or commands for specific images. The document data stream has a hierarchal structure. A mechanism to provide dictionaries is provided which will process dictionary entries as if they were macros, where the dictionary entry becomes part of the original document data structure. The storage of the references to the dictionaries is accomplished in a tree-linked stack structure with a last in first out arrangement which allows for a faster search order of dictionaries. The tree-linked stack structure further allows for a correct identifier to be associated with a given reference thereto, even if different dictionaries within the document data stream might be present. The context of the document data stream and the level in which a call is made determines the dictionary which is being referenced. This provides a macro facility ability in a document data stream. Context declarations are processed in a similar manner to determine the context of declarations within the inputted document data stream.

26 Claims, 13 Drawing Sheets

```
<!DOCTYPE SPDL PUBLIC 'ISO/IEC 10180//DTD SPDL Instance//EN'>
<SPDL>
<comment>
         SPDL Test File Header

      Copyright 1991 by Ricoh Corporation
      All Rights Reserved
      Confidential and Proprietary

      File    : ctxdcll.pro

      Author  : Tetsuro Motoyama

      Version: 0.01

      File Created: June 5, 1991
      First Draft : June 5, 1991

      Update History:
      Dec 30: TM: add <dictid> before <name> in the <ctxtdecl>

      Description: This is a test file for SPDL syntax checking.
        Creating the three dictionaries through the Dict. Gen. and
        manipulate the context stack by context declaration.

      References:
         1. ISO 10180
         2. ISO 8879
         3. PS2 Reference Manual
         4. ISO 9070
         5. ISO 8824
         6. ISO 8825
         7. ISO 9541
      Note: Put PSEUDO codes before each SPDL test file.
      - SPDL PSEUDO CODE LISTING -
      SPDL
         Document=picture      % three dictionaries are defined
           prologue
         Dictionary Generator dictid=alpha size 3
         Dictionary Generator dictid=beta  size 4
         Dictionary Generator dictid=gamma size 5
       pictbody
        tokenseq 2 3 a  %expect the a in the gamma to be executed
         picture
          prologue
           context decl  gamma beta alpha
           pictbody
            tokenseq 2 3 a  %expect the a in the alpha to be executed
```

*FIG. 9a*

```
</comment>
  <document>
    <picture spdlid='ISO/IEC 10180//SPDL'
     cntnttyp='ISO/IEC 10180//ContentType/SPDLClearText'>
      <comment> spldid and cntnttype are Public Object ID values
      </comment>
    <prologue>
      <dictgens>
        <dictgen size='3'><dictid><name>alpha</name></dictid>
          <tokenseq>
            % The operand stack has the dictionary reference (6-21)
            dup /a (add) put
            dup /d (div) put
            dup /m (mul) put
          </tokenseq></dictgen>
        <dictgen size='4'><dictid><name>beta</name></dictid>
          <tokenseq>
            dup   /a (div) put
            dup   /d (mul) put
            dup   /m (add) put
            dup   /s (sub) put
          </tokenseq>
        </dictgen>
        <dictgen size='5'><dictid><name>gamma</name></dictid>
          <tokenseq>
            dup   /a (mul) put
            dup   /d (add) put
            dup   /m (sub) put
          </tokenseq>
          <tokenseq>
            dup   /s (div) put
            dup   /c (cos) put
          </tokenseq>
        </dictgen>
      </dictgens>
```

*FIG. 9b*

```
    <comment>
          dictionary stack
               gamma
               beta
               alpha
    </comment>
  </prologue>
  <picbody>
        <tokenseq>
          2 3 a  %expect the result to be 6
        </tokenseq>
        <picture>
            <prologue>
                <ctxtdecl>
                    <dictid><name>gamma</name></dictid>
                    <dictid><name>beta</name></dictid>
                    <dictid><name>alpha</dictid></name>
                </ctxtdecl>
            </prologue>
            <comment>
                  dictionary stack
                       alpha
                       beta
                       gamma
            </comment>
            <picbody>
                <tokenseq>
                    2 3 a  %expect the result to be 5
                </tokenseq>
             </picbody>
          </picture>
       </picbody>
       </picture>  <comment> printing the first page </comment>
    </document>
</SPDL>
```

FIG. 9c

COMMAND DEFINITION DICTIONARY HANDLING AND CONTEXT DECLARATION IN A DOCUMENT PUBLISHING PAGE DESCRIPTION LANGUAGE (PDL)

CROSS-REFERENCES TO RELATED APPLICATIONS

This application is a continuation-in-part of U.S. patent applications, Ser. No. 07/876,601, now U.S. Pat. No. 5,319,748, issued Jun. 7, 1994, and Ser. No. 07/876,251, now U.S. Pat. No. 5,325,484, issued Jun. 28, 1994, both filed on Apr. 30, 1992, and entitled "Method and Apparatus to Manage Picture and Pageset for Document Processing" and "Method and System to Handle Inclusion of External Files into a Document Processing Language," respectively.

BACKGROUND OF THE INVENTION

1. Field of the Invention

This invention relates generally to computer controlled printing of documents having text and graphical components and more particularly to a method and system for handling dictionary generation and context declaration in a structured page description language intended to be printed or displayed. In this regard, the presentation of a document on a page involves the printing of a page on a fixed medium such as paper, transparency or the like, or presenting a page on a visual display or transmitting to another device the document in a form to be presented or stored. This invention is particularly useful for the automatic translation between the different data and printing formats used for a variety of presentation devices. This invention is also useful for the transmission of data to other devices in a communication system. The present application is related to commonly owned co-pending U.S. patent application Ser. No. 07/778,578, filed on Oct. 17, 1991, and U.S. patent applications Ser. Nos. 07/876,251, and 07/876,601, filed on Apr. 30, 1992, each of these disclosures being incorporated by reference herein.

2. Discussion of the Background

The development of laser printers in the early 1970s provided an opportunity for high quality, low cost printing of documents, which contained not only character text but also general graphical material. The primary method of controlling commands by the computer to the printer employed the so called "escape sequence" commands, similar to the type of commands used in the DIABLO® command sequence. These types of commands were distinguished from typical character data by preceding each command with a special byte, generally an escape character (ASCII 27). This methodology works acceptably with daisy wheel or dot matrix printers but is not well suited for printing documents that might have changing requirements. For example, as needs change and as technology improves, an upgrade to the presentation device is necessary. This type of upgrade in the past would have required removal of the program controller of conventional presentation devices. At a minimum, a new PROM containing instructions for the printer would be required. This is not a commercially acceptable way of handling temporary changes, as a new PROM would be installed for a few print jobs, and would then have to be replaced with the original PROM or another new PROM. This method of upgrade is wasteful and results in many failures of the presentation device controller.

The present inventor recognized a need to provide a dictionary approach to the above problem where dictionary definitions, which could be accessed as part of the content of a structured inputted data stream, are provided to the presentation device.

As a response to the limitations inherent in the escape sequence commands, different types of "page description language" (PDL) were developed generally to control laser printers or other types of page printers. Backward compatibility of these laser printers was provided by way of an ability to accept escape sequence commands. Two current examples of page description language are the PostScript® system from Adobe Systems Incorporated and InterPress® from Xerox® Corporation. Several other proprietary PDLs are also known.

The prior art page description languages provided various improvements to the standard escape sequences known previously, such as by providing tools and syntax for manipulation of objects, or by providing for the use of operand stacks or the like. Moreover, they are stack-oriented programming languages. These languages also allowed, in some cases, for dynamic changes in the printer's state, such as the ability to add fonts or graphical images to the resources that might be available to the printer. Some of these features are documented in such generally available reference works as Adobe System Incorporated's "PostScript Language Reference Manual" and the "PostScript Language Program Design," both by Addison-Wesley Publishing Company (1985 and 1988, respectively). Other PDLs are also described in various technical and reference books such as "InterPress, The Source Book" by Harrington et al. (Simon and Schuster, Inc., 1988).

A standardized page description language has been proposed and is being developed as an international standard by the ISO. The proposal, to which the present inventor is a contributor, is currently in draft form before a section of the ISO. The draft is known as ISO/IEC DIS 10180 and is labeled "Information Processing Text Communication Standard Page Description Language." The current draft is dated 1991.

Many of the prior art types of page description languages suffer from various flaws. For example, one shortcoming of the PostScript® language is that a page description for a particular document can contain a new definition such as a resource definition (i.e. an additional font) or a new dictionary definition that can be used anywhere in the document. In other words, no structure is enforced in PostScript® and therefore, the entire content of the document must be processed to determine whether a particular printer has the resources necessary to print it. If this "preprocessing" is not performed, it is possible that the printing of a document may fail at any point during the printing process, even at the very end, due to the inability of the printer to comply with commands of the document page description.

Additional problems are associated with the prior art systems that employ PostScript®. For example, to print a given page of a document, it is generally necessary to read and process, before presenting a page, the entire PDL description of all the preceding pages of the document, in order to decide the state of the document page setup parameters (i.e., resource declarations, dictionary definitions or the like). In other words, a print controller program must read the entire PDL description of a document to consider the effect of every page setup command between the beginning of the document and the specified page. While this page setup scanning process is relatively straightforward, it does require a significant amount of processor time, which can be better used by the printer.

Additionally, there are no syntax or semantics defined in the PostScript® language to handle a structure, a prologue or a scope of a data declaration. There is a convention. This convention, however, does not need to be followed.

One problem with the well known InterPress® system from Xerox® is that its structure does not effectively handle dictionary definitions contained in an inputted data stream. Nor does InterPress® use the prologue structure in an expeditious manner. Also, the standard InterPress®encoding is binary rather than clear text which a human can read.

The ability to use or add dictionary definitions or to generate a standard dictionary allows for a "global" type of change to be provided in the presentation device. This is done so that documents containing a dictionary can be used to provide a library of sorts. For example, a shorthand in future documents can use a standardized shorthand, so that processing can be easily expedited in a future or even the same document data stream. The present invention permits the management of created read-only dictionaries in the hierarchial structure of a document data stream as discussed in U.S. Patent application Ser. No. 07/876,601. This invention allows for the deletion of dictionaries and other data structures at the end of their scope as shown in the aforementioned U.S. patent application Ser. No. 07/876,601.

SUMMARY OF THE INVENTION

Accordingly, one object of this invention is to provide a method and apparatus for the management of context stack and read-only dictionaries generated in prologue.

The inclusion and generation of dictionaries by the presentation device is important in providing increased flexibility for a document description language or the data stream that describes a document when it is being printed. Specifically, the use of dictionaries adds flexibility because of the shortened look-up times for key procedures especially if these procedures are repeated. Further flexibility is provided by allowing a variable by key-value combination feature. The creation and inclusion of dictionaries, in the present invention, allows the printing device or the display device to add and to use these new features and to include the use of these features in a document data stream within the scope of the hierarchical document structure. This increases the flexibility of the system and allows easier management of the end of scope.

It is another object of this invention to provide a means by which document data streams may be modified by using a dictionary in a way that can be processed efficiently both by the presentation device and the device producing the inputted data stream.

It is yet another object of this invention to provide an apparatus and methodology for altering data streams, which are used, or intended to be used, for the printing of a document with a shorthand, contained within a dictionary, in a structured approach.

It is yet another object of this invention to provide an apparatus and methodology for adding capabilities to a printer by controlling the context in which a dictionary, or for that matter, any portion of the inputted data stream is managed in a structured environment. These additional capabilities are processed in a structured approach.

These and other objects are achieved according to the present invention by providing a new and improved apparatus for controlling the presentation of documents represented in a document descriptive language form. Dictionary generation and handling, as well as context declarations handling, are easily processed. This control allows for a structured approach to the processing. According to the invention, this is accomplished by providing each block of document data stream with zero or one prologue, which contain definitions and declaratory commands, and content portions, which contain specific tokens or commands for defining specific images. The blocks are arranged in a tree-linked hierarchy. This hierarchy allows for dictionary generators to be employed, with the most recently entered dictionary generator occupying a higher position in the hierarchy than earlier entered dictionary generators.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a pseudo code listing of an example of an SPDL document structure with a dictionary generator and context declarations.

DETAILED DESCRIPTION OF THE DRAWINGS

Figure 1:
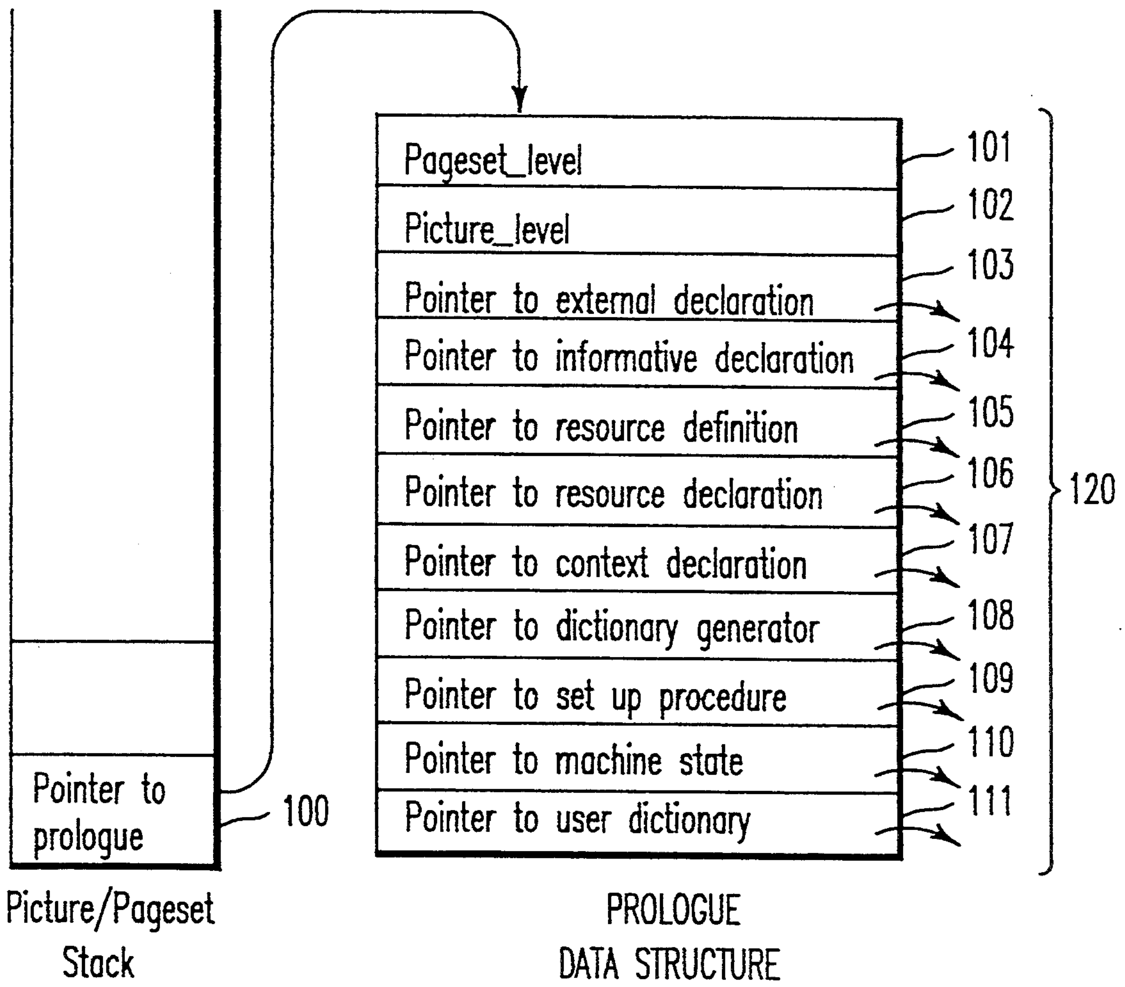
FIG. 1 is an illustration of a stack arrangement, which keeps track of a picture and pageset of a document represented in the structured Standard Page Description Language (SPDL) form of this invention.

Referring now to FIG. 1 wherein the picture and pageset stack arrangement of this invention are illustrated. A stack arrangement is used in which a pointer to a "prologue" 100 provides location information with respect to a prologue data structure 120 for a given document description. A given pageset level, in the hierarchic structure, is defined in item 101. A given picture level assigned to a given prologue is set in a picture level entry 102. A series of pointers 103, 104, 105, 106, 107, 108, 109, 110 and 111 identify the various items such as an external declaration 103, an informative declaration 104, a pointer to a resource definition 105, a pointer to a resource declaration 106, a pointer to a context declaration 107, a pointer to a dictionary generator 108, a pointer to a setup procedure 109, a pointer to the machine state 110, and a pointer to a user dictionary 111. A document description is obtained from the structured portion of a document data stream.

Figure 10:
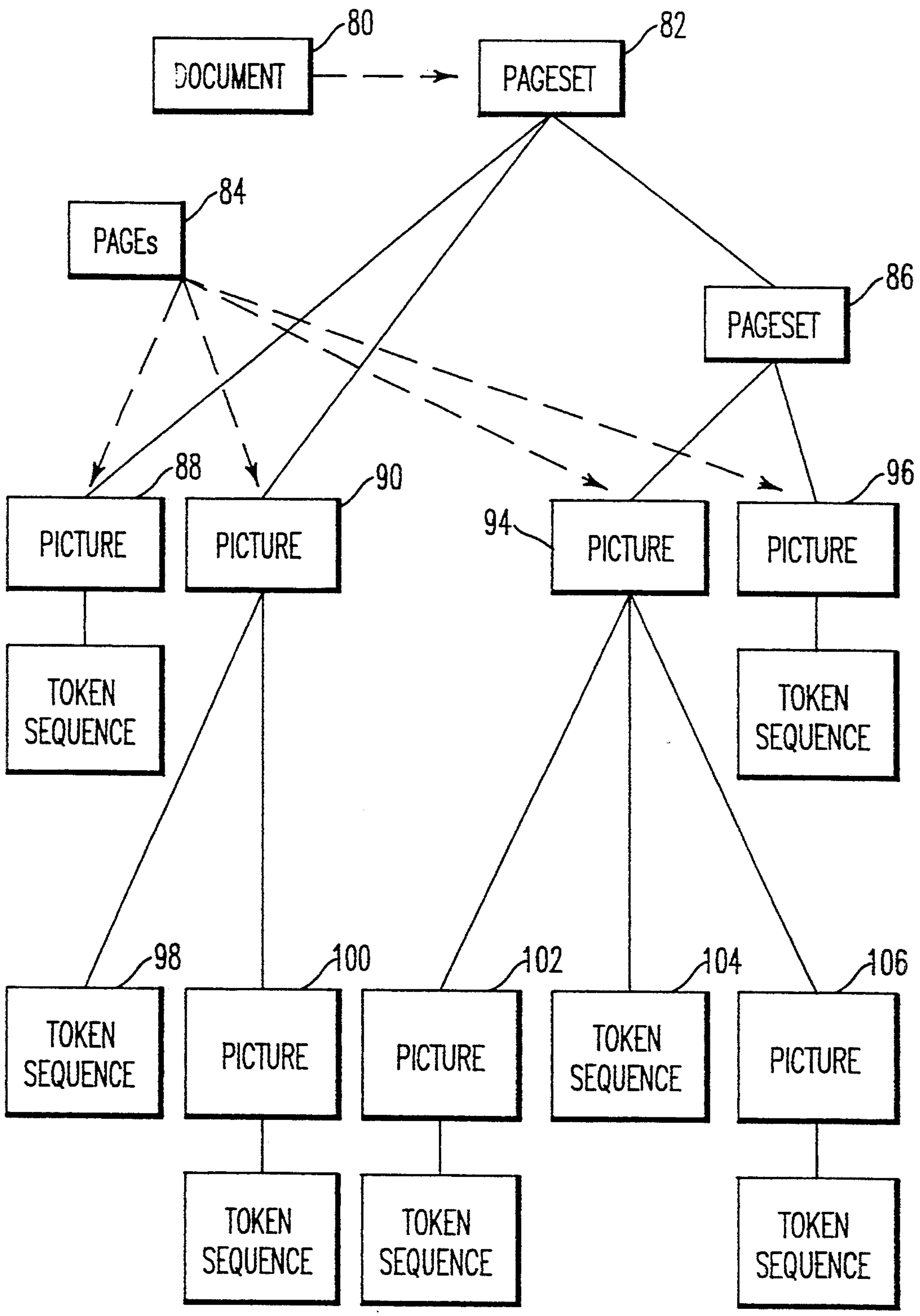
FIG. 10 is an example of a conventional SPDL document structure.

FIG. 10 is illustrative of an example of a conventional SPDL document, of the type used or processed by the present invention. It should be noted at this juncture that the basic structure of the document data stream is as set forth in the aforementioned proposed ISO standard. Each document contains a document description, which will have both structure elements and content elements. The document structure and its related elements are independent of the content of the document and may be processed independently of the content of the document. The content is in the form of a page description language. Its processing is dependent upon the document structure, its elements and the context in which it occurs. The dictionary generator is a structure element, which defines a single dictionary and binds a name to that dictionary. The prologue structure element can contain zero or more dictionary generators. In the context of a structured document data stream, a dictionary is a set of ordered pairs of objects. Each of the ordered pairs is comprised of objects called, for the purposes of this disclosure, a key and a value.

The ordered pairs in a dictionary allow for the "replacement" of one item (i.e. the value in an ordered pair) with a shorthand object, which functions as the key. As will be set forth below, the value may comprise any type. This provides a shorthand, which allows the building of procedures, variables and parameters. Further, by structuring the search sequence of the ordered pairs among the various dictionaries, the correct pair of key and values will be found.

A tree-linked hierarchy is employed in this invention as will be set forth below. This provides an important advantage in that any dictionary generator (or any other portion of the document) may be processed or printed with processing prologues of prior blocks of the document. Only structural definitions, in the hierarchical tree, which are above a selected portion of a document, need be processed. That is to say if, for example, page three of a twenty page document needs to be processed, only page three and the attendant prologues that are at page three's level or above in the hierarchical tree need be processed. This increases the efficiency and also facilitates the determination of the level of resource needed by a document before the commencement of the actual printing of the document. With respect to dictionaries, this provides significant improvements in the speed of processing and also requires only the processing of those dictionaries that are necessary. As dictionaries at a lower level may use some of the items, this allows for a quicker processing of the dictionaries.

A further advantage is a context declaration, that selects the dictionaries and determines the search order among the selected dictionaries.

When the purpose of structure processing is presentation, the structure processing establishes the context of interpretation of each element of document content. It should be noted that when structure processing is for purposes other than document presentation there is usually no need to perform image related content processing. The totality of all such data is referred to as the environment of the presentation process.

A conventional SPDL document structure, as shown in FIG. 10, is a result of the division and repeated subdivision of an SPDL document into increasingly smaller parts. Each of these resulting parts is called a structure element.

The SPDL document structure is hierarchical in nature. The highest level, shown in FIG. 10 for example, is a document 80. A document may contain subordinate structure elements, which are called pageset 82 or picture structure elements.

A pageset 82 may in turn contain subordinate pagesets and/or pictures. Each picture contains a description of the document. The highest level of picture, in the picture hierarchy, is a page presented on a single instance of the presentation medium (i.e. a single page).

A picture may contain subordinate structure elements called pictures 100, 102, and 104, and/or tokensequence structure elements. A tokensequence is a structure element that contains document contents.

A document is simply a pageset or a picture which is at the highest level in the structure hierarchy. Similarly, a page is simply a picture which is at the highest level in the picture hierarchy.

In this context, the terms pointer and subpointer refer to the conventional data structure concept of providing information as a data entry not the data itself. That is to say, the pointers are data pointing to a given memory location or to another pointer. This definition is recursive in that a pointer may be to another pointer. Resource declarations and definitions are generally directed to such items as fonts, filters, patterns, colors, glyphs or the like and may be available by invoking a token within the data stream provided to the printer or resource device. Resource declarations bind a name to a specified resource, while resource definitions supply the exact nature of each resource.

Dictionaries are used to translate key values into given values of any type and may be considered similar to a macro definition.

Figure 2A:
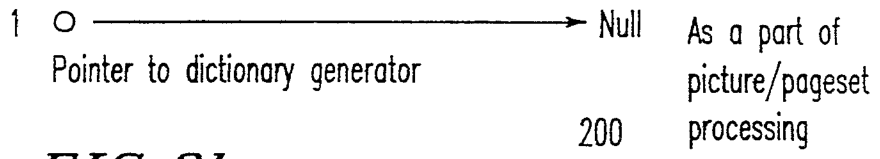
FIGS. 2A–2C are an illustration of the steps in the pointer method of adding dictionaries generated by a dictionary generator to the data structure shown in FIG. 1.
Figure 2B:
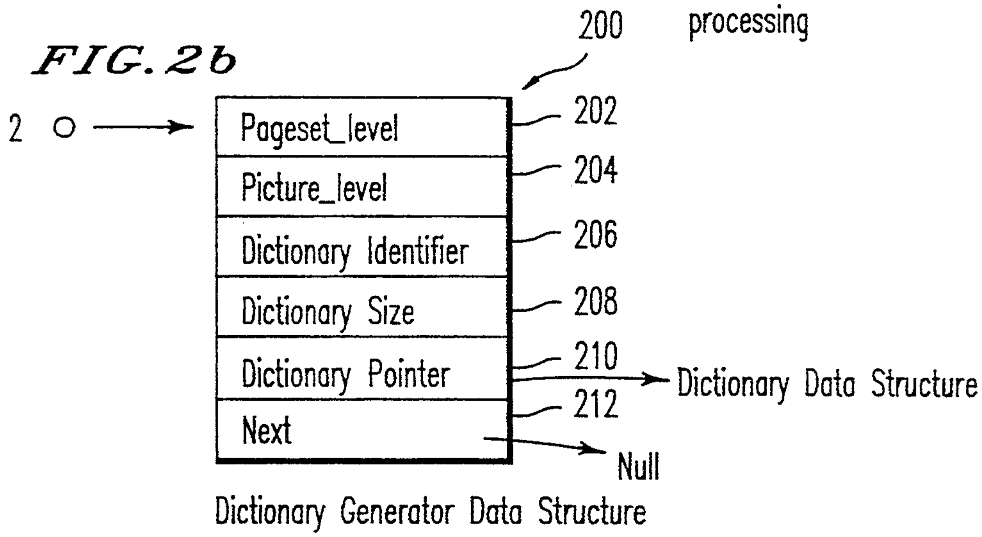
Figure 2C:
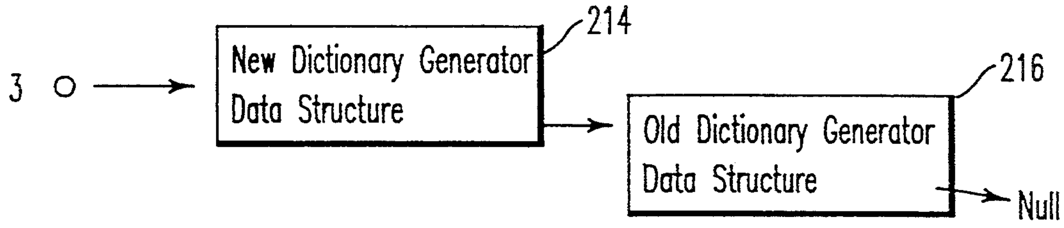

Specifically, the pointer and method shown in FIGS. 2A–2C implements a pointer to a dictionary generator, which is shown in the prologue data structure 120, shown in FIG. 1. At the beginning of a picture or pageset this pointer points to a "null" before any dictionary generator is encountered in the inputted document data stream (FIG. 2A). This is intuitive in that when a picture or pageset is first encountered in the processing, it is before any dictionary generator structure element and therefore no dictionary generators would be present as shown in Ser. No. 07/876,601. When handling subordinate pictures and pagesets, the method shown in Ser. No. 07/876,601, is used for setting up the correct pointers. That is, when the beginning of the subordinate picture or pageset is encountered, the pointer to the prologue which points to the newly created Prologue data structure is used in the Picture/Pageset Stack 100. The Pointer to dictionary generator entry of this newly created prologue data structure will point to the same entity as the one pointed by the Pointer to dictionary generator in the Prologue data structure pointed by the pointer to the prologue which is one entry below in the Picture/Pageset Stack (704 pointing to 710 in FIG. 7). Consequently the value of the pointer will be a "null" value and no memory will be allocated. When a dictionary generator is encountered, the memory necessary for a dictionary generator declaration data structure is allocated at the printing, display device, or processing system as is memory for the dictionary itself. This pointer is then changed from a "current" value to the address of the allocated memory for the dictionary generator data structure (FIG. 2B). The next labeled item in the dictionary generator data structure will then point to the old "current" value, as a first dictionary generator declaration data structure is processed by inserting the data structure right after the prologue data structure. The next dictionary generator is inserted between prologue data and the first dictionary data structure pointed by its entry.

The dictionary generator data structure 200, of FIG. 2B also comprises information as to a pageset_level 202, a picture_level 204, a dictionary identifier 206, a numerical value indicative of the given dictionary's size 208, a pointer 210 to an actual dictionary data structure associated with the dictionary being generated, and a pointer 212 to the "next" dictionary generator. The pageset_level 202 and the picture_level 204 are used to manage the memory when the end of a current picture or pageset is encountered. For example, when the current picture ends, the current picture_level was 2 and pageset_level 1. Then, all the objects with the picture_level=2 and pageset_level=1 and the data structures pointed by those objects (dictionary pointed by Dictionary Pointer in the Dictionary Generator Data Structure) will be deleted. As each new dictionary generator is encountered in the document data stream, memory for the dictionary to be generated is also allocated at the presentation device or processing system. The processing is accomplished, as will be set forth below, with respect to FIGS. 5*a* and 5*b*. If any other dictionary generator is encountered in the inputted document data stream, the structure for that dictionary generator is placed in front of any prior generator. This means that the latest dictionary generator will be searched first in any insuring search order. This placement allows for a last in first accessed search pattern.

Figure 3A:
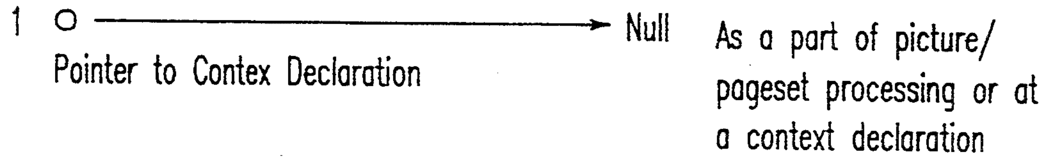
FIGS. 3A–3C are an illustration of steps in the pointer method of adding dictionaries into a context stack using a context dictionary data structure.
Figure 3B:
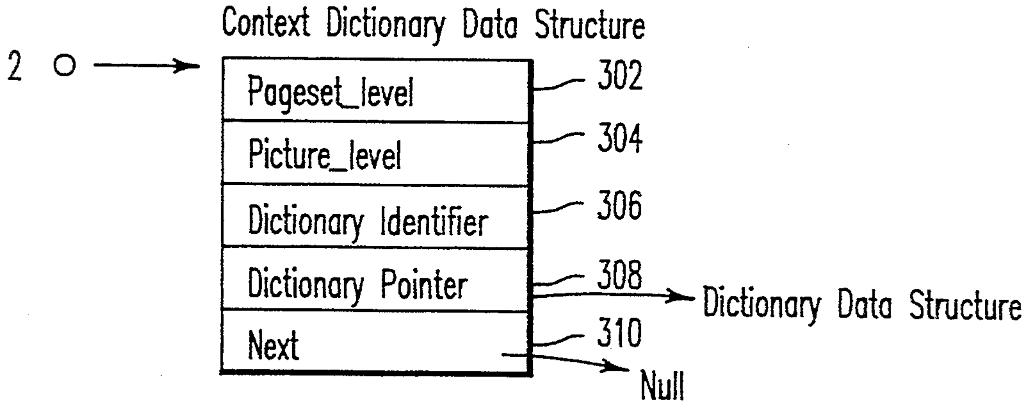
Figure 3C:
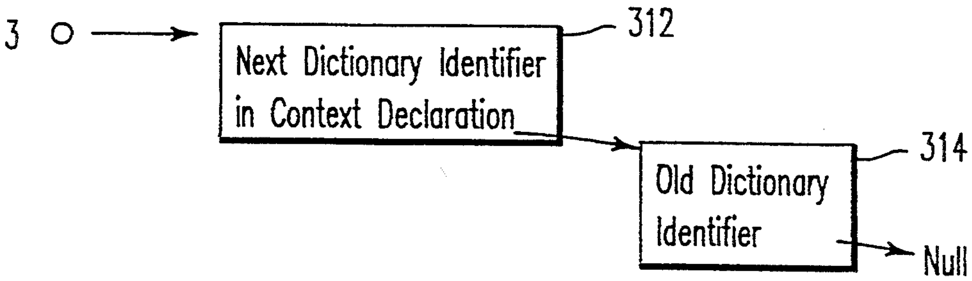

FIGS. 3A-3C show the use of a pointer for a context stack which defines the search order of dictionaries. A context stack is a stack of dictionary references, and is controlled by context declaration, dictionary generator and operators in a token sequence. When a key is encountered, the search is performed among dictionaries from the top to the bottom of the context stack. The bottom of the stack is a system dictionary which contains the operators. On top of the system dictionary is a user dictionary. As indicated in FIG. 3A, the pointer is initially a pointer to a context declaration in the prologue data structure 100 of FIG. 1 and is set to "null". As described in U.S. patent application Ser. No. 07/876,601, the pointers to context declaration in a prologue data structure pointed by entries above the bottom of picture/pageset stack points to the same entry as the one below (804 pointing to 810 in FIG. 8) at the beginning of a picture or pageset. When a context declaration is first encountered in the inputted document data stream in a prologue section the context declaration pointer 301 will also point to "null". This is the difference between the processing of a context declaration and the other elements in a Prologue. For each new dictionary identifier in a context declaration, a context dictionary data structure 300 is created and linked (FIG. 3B). This "newer" dictionary identifier is inserted between a pointer to a context declaration of an "old" dictionary identifier 314 and its pointed context dictionary data structure.

Figure 4:
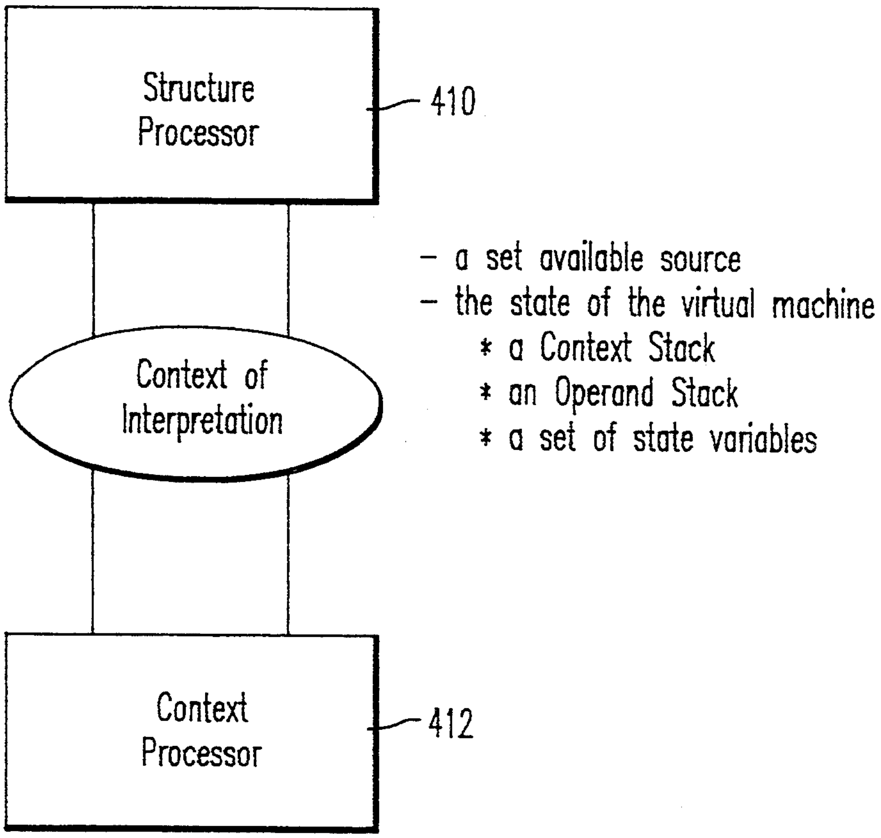
FIG. 4/is a schematic illustration of the interconnection between a simplified structure processor and a content processor which process a SPDL document according to one embodiment of this invention, more expeditiously than the processing shown in U.S. patent application Ser. No. 07/778,578, filed on Oct. 17, 1991.

A conceptual interface between a structure processor 410 and a content processor 412 is shown in FIG. 4. At each level there is a "virtual machine" that is created and the state of the virtual machine and the context of a given document are available to the structure processor 410. The content processor 412 will have the context stack and operand stack and state variables available to it. This availability to the content processor 412 allows the structure processor 410 to communicate with the content processor 412. The context of interpretation is used to pass the necessary information between a structure processor and a content processor.

Figure 5A:
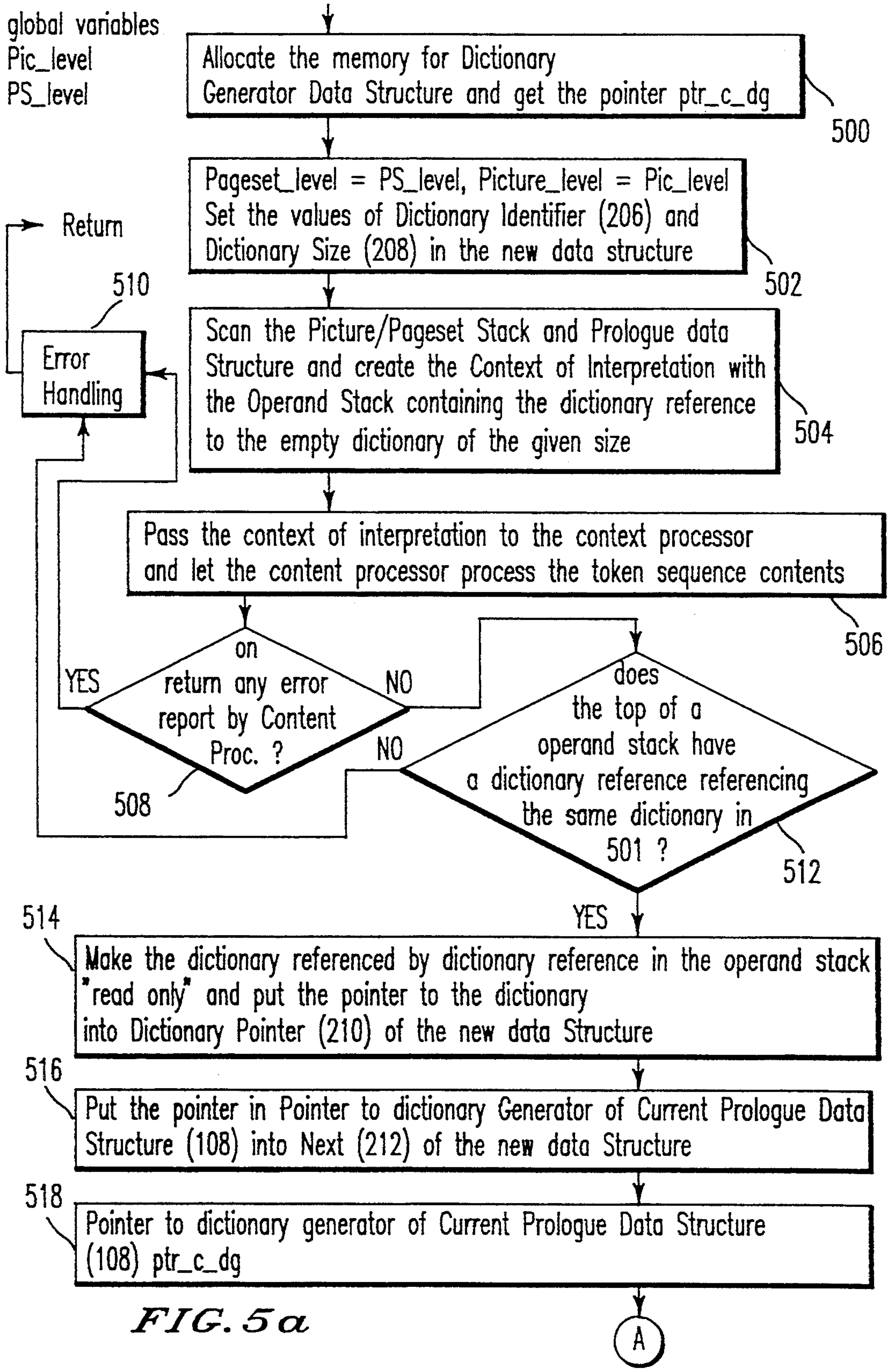
FIGS. 5*a* and 5*b* are flow charts illustrating processing steps of a dictionary generator according to this invention
Figure 5B:
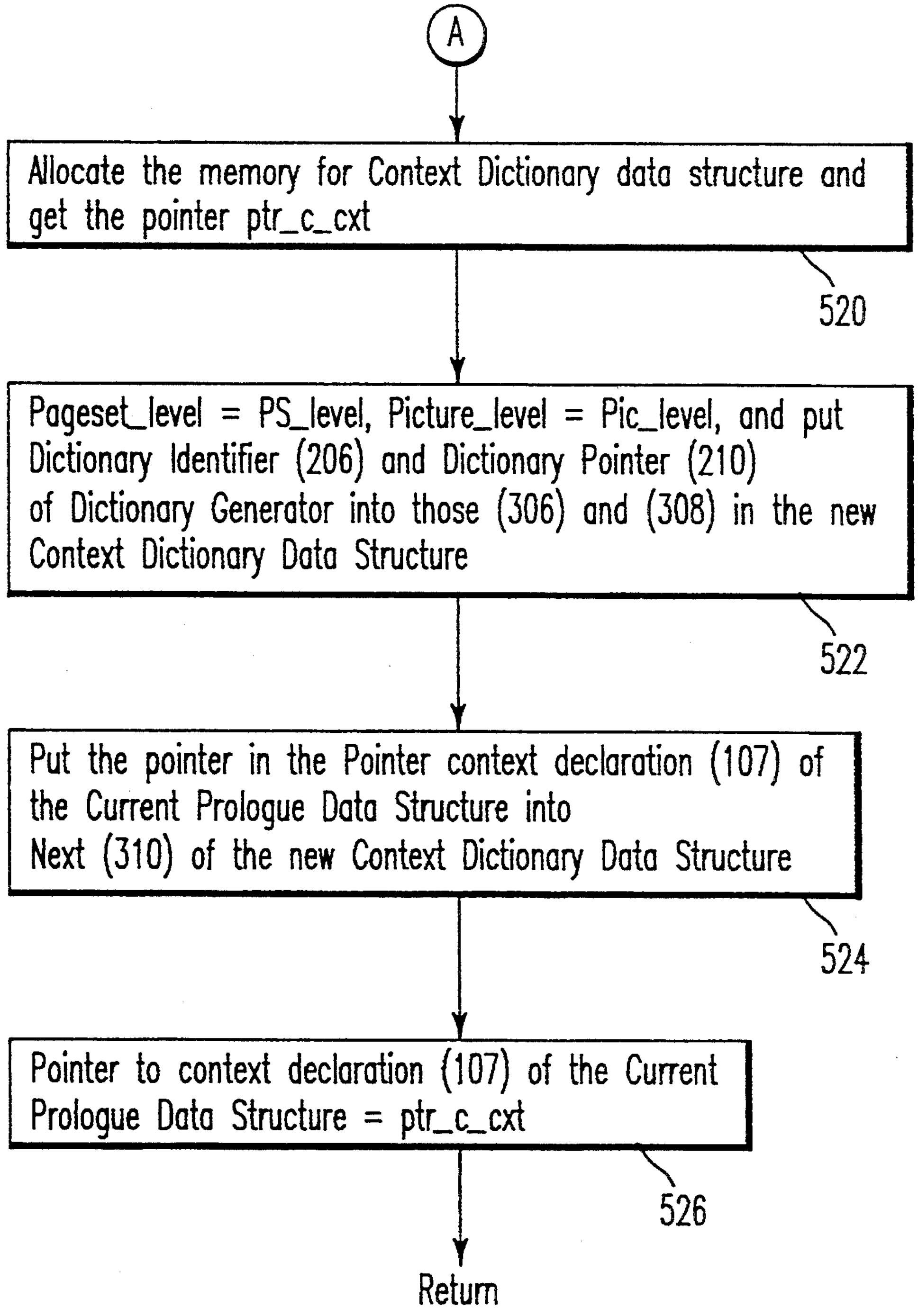

FIGS. 5*a* and 5*b* show a dictionary generating process. Before entering this process, a lexical analyzer/-parser processor (not shown) processes the inputted data stream and recognizes the dictionary generator in the inputted document data stream. Then the processor calls the dictionary generator processor with the necessary parameters such as a dictionary identifier item 206 in FIG. 2B and the dictionary size 208 in FIG. 2B. This is accomplished in step number 502 of FIG. 5*a*. In step 504, the top entry of the picture/pageset stack points to the current prologue data structure to be used to construct the context of interpretation. The scanning is accomplished by tracing a link list as set forth in FIG. 1 and links initiated by pointers. After a "null" is encountered in the link from the pointer to a context declaration of the current prologue data structure, the user dictionary from the current prologue data structure and system dictionary are added in the stack. State variables and other necessary elements are similarly determined by tracing the link list. In step 506, the current context of interpretation is passed to the content processor to process the token sequence for dictionary construction. Error detection and reporting by the context processor is performed in step 508, with an error handling routine 510 being used to accomplish generalized error handling for this process. In step 514 the dictionary referenced, by the dictionary reference, is marked "read only" and a pointer to that dictionary (210 of FIG. 2) is placed in the new data structure. In step 516, a pointer is provided to the dictionary generation of the current prologue data structure (108 of FIG. 1) into the pointer called "next" (212 of FIG. 2) in the new data structure. In step 518 a pointer to the dictionary generator of the current prologue data structure (108 of FIG. 1) is set equal to ptr_c_dg. In FIG. 5*b*, in step 520, memory is allocated for the context dictionary data structure and a pointer is allocated. In step 522, the various levels are set in the context dictionary data structure. In step 524, the pointer to a context declaration (107 of FIG. 1) is placed into the pointer called "next" (310) of FIG. 3B of a new context dictionary data structure. A pointer to the context declaration (107 of FIG. 1) of the current prologue data structure is then set in step 526. By doing so, the context stack will be augmented by using the new dictionary.

Figure 6:
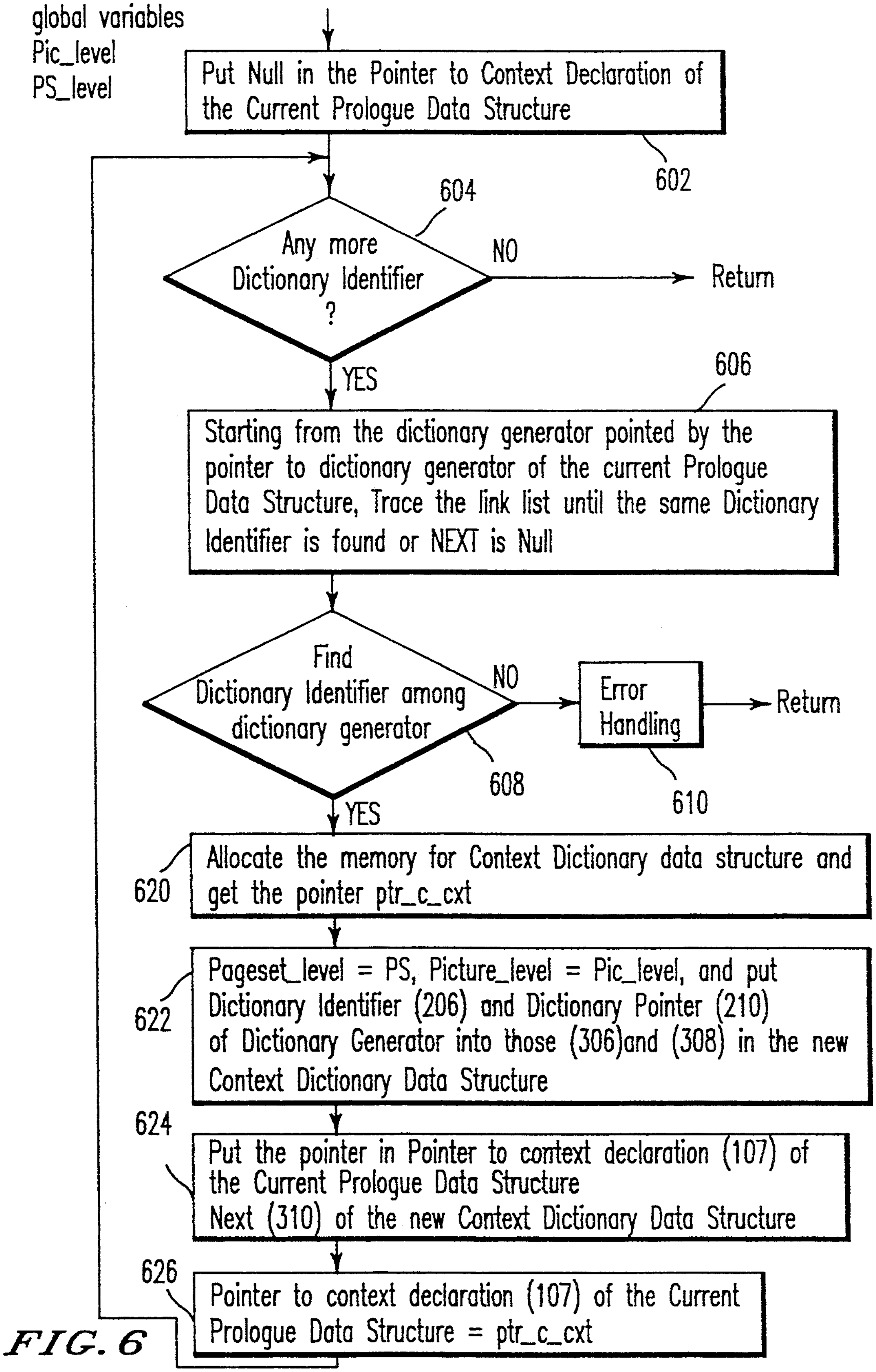
FIG. 6 is a flow chart illustrating processing steps of a context processor according to this invention.

In FIG. 6, the context declaration processing is shown. The initialization of the processing is set forth in step 602. Global variables such as the picture level and page set level are provided to the context declaration processing. The lexical analyzer/parser processor analyzes the input document data stream and recognizes a context declaration in the inputted document data stream. A null is placed in the pointer to the context declaration (107) of the current prologue data structure (120) in step 602. A determination as to whether or not there are any additional dictionary identifiers is made in step 604. If none are present, a simple return is accomplished in the Context Declaration processing. However, if an additional dictionary identifier is found, the link list from the pointer to the dictionary generator (108) of the current prologue data structure (120) is traced until the dictionary identifier is found or the until the next entry is "null". If the next entry is "null" the Dictionary Identifier is incorrect and can not be found. Therefore, the error handling (610) is called. When the Dictionary Identifier is found, memory is allocated for the context dictionary data structure and a pointer is allocated in step 620. In step 622, the various levels are set in the context dictionary data structure. The pointer to a context declaration (107 of FIG. 1) is placed into the pointer called "next" (310 of FIG. 3B) of the new context dictionary data structure in step 624. A pointer to the context declaration (107 of FIG. 1) of the current prologue data structure is then set in step 626.

Figure 7:
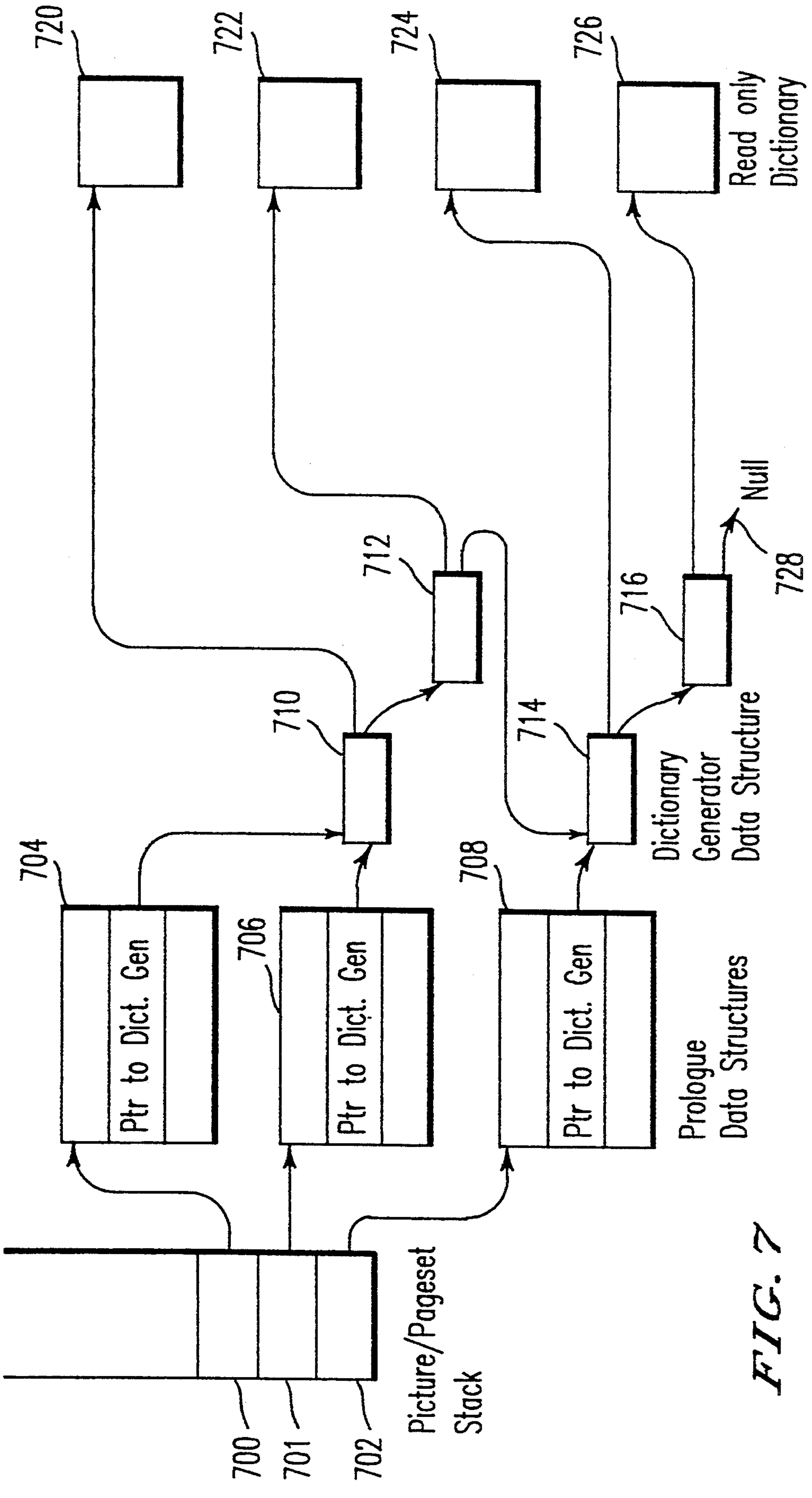
FIG. 7 is a diagram of the relationship of elements created by a dictionary generator in the related data link.

As shown in FIG. 7, the generator link list for individual pointers may be traced for example from pointer 700 in the picture/pageset stack to the prologue data structure 704, to dictionary data structures 710 and 712, then to dictionaries 720 and 722. The dictionaries 720, 722, 724 and 726 are "read only" dictionaries which have been flagged as being read only in step 514 of FIG. 5*a*. Depending upon the identifiers which are present in the dictionary, the tracing will follow any one of the multiple paths which are noted in FIG. 7 starting at one of the pointers 700, 701 or 702 and tracing through the various dictionary data structures 704, 706, or 708 and following into dictionary generator data structures 710, 712, 714, or 716 and ending at either dictionaries 720, 722,724 or 726, or at the "null" entry 728. It should be noted that the "null" pointer 728 is present outside of dictionary generator data structure 716 so as to provide an "end of the tail".

FIG. 7 shows the following case. The highest block is a pageset corresponding to the entry 702 which has a prologue 708 with two dictionary generators 714 and 716. The dictionaries created in the prologue were 724 and 726. The subordinate block of 702 is either picture or pageset corresponding to the entry 701 with the prologue 706. 706 contains two dictionary generators 710 and 712 with the dictionaries 720 and 722. The most recent block which is subordinate to 701 is most likely to be a picture corresponding to the entry 700 which has the prologue 704 without a dictionary generator.

Figure 8:
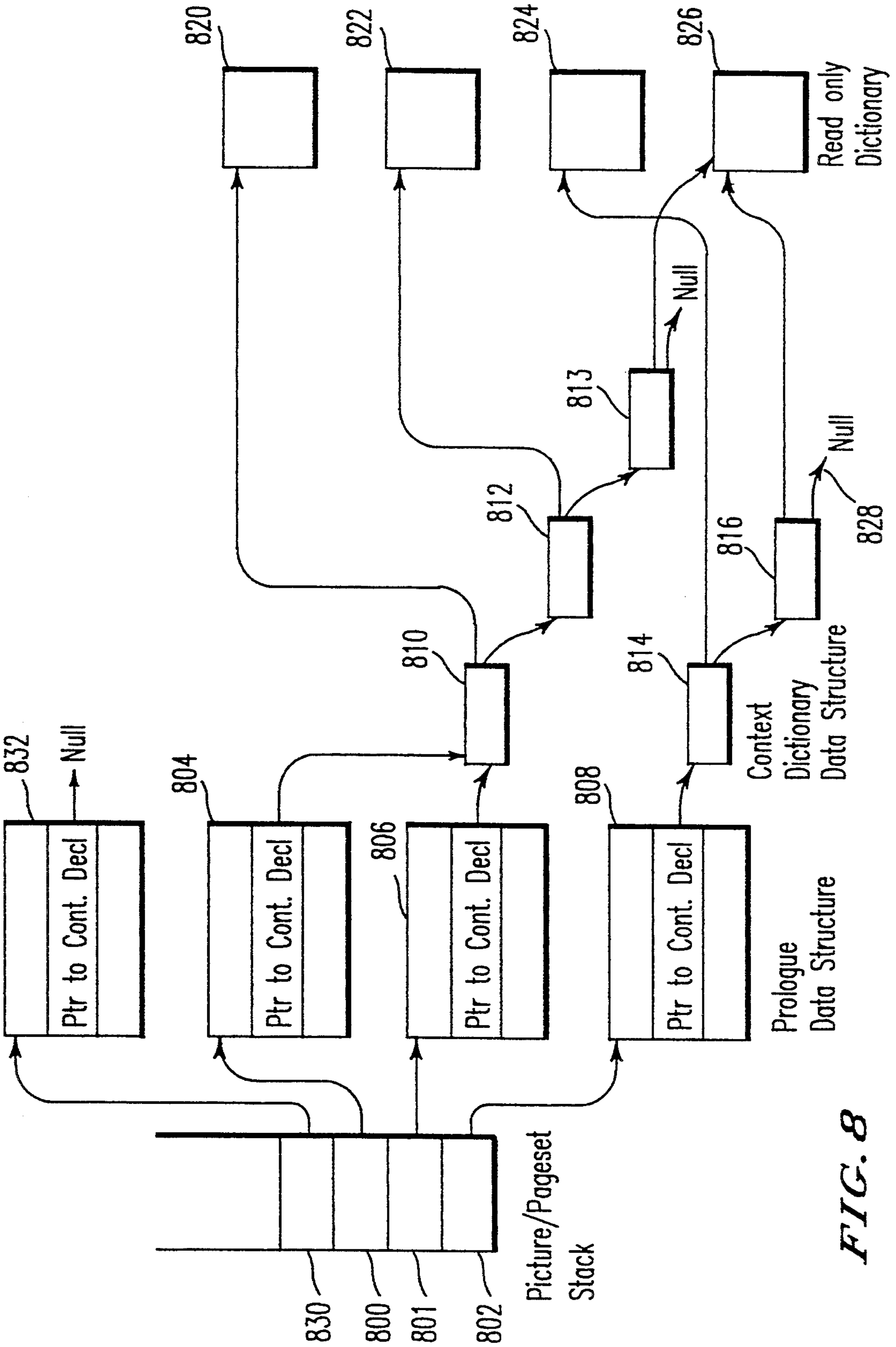
FIG. 8 is a diagram of the relationship of elements created by a context declaration and dictionary generators in the related data link.

FIG. 8 shows the linked list of dictionaries which are controlled by the context declarations. The top entry 830 in the Picture/Pageset Stack shows the current block that is subordinate to the prior blocks corresponding to 800, 801, and 802. The highest block is the block corresponding to the entry 802. In the case of the prologue corresponding to 832, the context declaration exists without the dictionary identification. Therefore, within this block, the initial current context of interpretation will have a context stack (dictionary stack) of user dictionary and system dictionary only. In the case of the prologue corresponding to 804, there is no context declaration. Therefore, the previous context declaration is inherited by pointing to 812. In the case of the prologue corresponding to 806, the context declaration may have only one dictionary identifier pointing to the dictionary (826) generated by the prologue 808. Two other dictionaries are put in by the two dictionary generators in the prologue. (See FIG. 5*b* and FIG. 7) 814 and 816 are similarly generated by the dictionary generators corresponding to the FIG. 7.

FIG. 9, as noted above, is a listing of an example inputted document data stream with various dictionary generators and context declarations being found. Multiple levels are present in this example and it is believed that this listing is illustrative of the various types of dictionary generations that may occur according to this invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of processing a hierarchically structured page description language document, comprising the steps of:

creating a primary data structure which is a stack, wherein each hierarchical level of the document has a corresponding level in the stack;

inputting an element indicating a beginning of a hierarchical level A of the document;

creating a plurality of references for a level A in said primary data structure, said plurality of references for the level A being used to keep track of parameters of the hierarchical level A of said document including a reference used for keeping track of dictionaries which are used during processing of the document, said dictionaries including key-value pairs;

inputting an element at the hierarchical level A indicating a predefined dictionary is to be used during processing of the document;

changing the reference used for keeping track of dictionaries to refer to said predefined dictionary;

inputting an element indicating a beginning of a hierarchical level B of the document which is below the hierarchical level A in the hierarchical structure of the document; and creating a plurality of references for a level B in said primary data structure which is different from the level A in said primary data structure, said plurality of references for the level B being used to keep track of parameters of the hierarchical level B of said document including a reference used for keeping track of dictionaries which are used during processing of the hierarchical level B of the document, said plurality of references for the level B being equal to said plurality of references for the level A when said plurality of references for the level B are created;

wherein the level A in said primary data structure which is a stack is pushed into the stack before the level B is pushed into the stack; and wherein said plurality of references for the level A comprises a reference in said stack to a plurality of subsequent references, and said reference in said plurality of references for the level A which is used for keeping track of dictionaries includes a reference from said stack to said plurality of subsequent references and one of said plurality of subsequent references refers to said predefined dictionary.

2. A method according to claim 1, further comprising the steps of:

processing a dictionary key at said hierarchical level B; and looking up said dictionary key in said predefined dictionary and determining the value corresponding thereto using said reference to said predefined dictionary contained within said plurality of references for the level B.

3. A method according to claim 1, further comprising the steps of:

inputting an element at the hierarchical level B indicating a second predefined dictionary is to be used during processing of the hierarchical level B; and changing the reference used for keeping track of dictionaries at the hierarchical level B to refer to said second predefined dictionary.

4. A method according to claim 1, further comprising the steps of:

inputting an element at the hierarchical level B indicating a second predefined dictionary is to be used during processing of the hierarchical level B; and changing the reference used for keeping track of dictionaries at the hierarchical level B to refer first to said second predefined dictionary and refer second to said first predefined dictionary.

5. A method according to claim 1, further comprising the steps of:

inputting an element at the hierarchical level B which indicates that no dictionaries of a predetermined type are to be used during processing of the hierarchical level B; and changing the reference used for keeping track of dictionaries at the hierarchical level B to refer to null.

6. A method according to claim 1, further comprising the step of:

creating a dictionary data structure which contains information about said predefined dictionary, after inputting the element at the hierarchical level A indicating a predefined dictionary is to be used during processing of the document;

wherein said one of said plurality of subsequent references which refers to said predefined dictionary refers to said dictionary data structure which contains information about said predefined dictionary and includes a reference to said predefined dictionary.

7. An apparatus of processing a hierarchically structured page description language document, comprising:

means for creating a primary data structure which is a stack, wherein each hierarchical level of the document has a corresponding level in the stack;

means for inputting an element indicating a beginning of a hierarchical level A of the document;

means for creating a plurality of references for a level A in said primary data structure, said plurality of references for the level A being used to keep track of parameters of the hierarchical level A of said document including a reference used for keeping track of dictionaries which are used during processing of the document, said dictionaries including key-value pairs;

means for inputting an element at the hierarchical level A indicating a predefined dictionary is to be used during processing of the document;

means for changing the reference used for keeping track of dictionaries to refer to said predefined dictionary;

means for inputting an element indicating a beginning of a hierarchical level B of the document which is below the hierarchical level A in the hierarchical structure of the document; and means for creating a plurality of references for a level B in said primary data structure which is different from the level A in said data structure, said plurality of references for the level B being used to keep track of parameters of the hierarchical level B of said document including a reference used for keeping track of dictionaries which are used during processing of the hierarchical level B of the document, said plurality of references for the level B being equal to the plurality of references for the level A when said plurality of references for the level B are created;

wherein the level A in said primary data structure which is a stack is pushed into the stack before the level B is pushed into the stack; and wherein said plurality of references for the level A comprises a reference in said stack to a plurality of subsequent references, and said reference in said plurality of references for the level A which is used for keeping track of dictionaries includes a reference from said stack to said plurality of subsequent references and one of said plurality of subsequent references refers to said predefined dictionary.

8. An apparatus according to claim 7, further comprising:

means for processing a dictionary key at said hierarchical level B; and means for looking up said dictionary key in said predefined dictionary and determining the corresponding value using said reference to said predefined dictionary contained within said plurality of references for said level B.

9. An apparatus according to claim 7, further comprising:

means for inputting an element at the hierarchical level B indicating a second predefined dictionary is to be used during processing of the hierarchical level B; and means for changing the reference used for keeping track of dictionaries at the hierarchical level B to refer to said second predefined dictionary.

10. An apparatus according to claim 7, further comprising:

means for inputting an element at the hierarchical level B indicating a second predefined dictionary is to be used during processing of the hierarchical level B; and means for changing the reference used for keeping track of dictionaries at the hierarchical level B to refer first to said second predefined dictionary and refer second to said first predefined dictionary.

11. An apparatus according to claim 7, further comprising:

means for inputting an element at the hierarchical level B which indicates that no dictionaries of a predetermined type are to be used during process of the hierarchical level B; and means for changing the reference used for keeping track of dictionaries at the hierarchical level B to refer to null.

12. An apparatus according to claim 7, further comprising:

means for creating a dictionary data structure which contains information about said predefined dictionary, after inputting the element at the hierarchical level A indicating a predefined dictionary is to be used during processing of the document;

wherein said one of said plurality of subsequent references which refers to said predefined dictionary refers to said dictionary data structure which contains information about said predefined dictionary and includes a reference to said predefined dictionary.

13. A method of processing a hierarchically structured page description language document, comprising the steps of:

creating a primary data structure which is a stack, wherein each hierarchical level of the document has a corresponding level in the stack;

inputting an element indicating a beginning of a hierarchical level A of the document;

creating a plurality of references for a level A in said primary data structure, said plurality of references for the level A being used to keep track of parameters of the hierarchical level A of said document including a reference used for keeping track of dictionaries which are used during processing of the document, said dictionaries including key-value pairs;

inputting an element at the hierarchical level A indicating a dictionary is to be generated and generating said dictionary;

changing the reference used for keeping track of dictionaries to refer to said generated dictionary;

inputting an element indicating a beginning of a hierarchical level B of the document which is below the hierarchical level A in the hierarchical structure of the document; and creating a plurality of references for a level B in said primary data structure, said plurality of references being used to keep track of parameters of the hierarchical level B of said document including a reference used for keeping track of generated dictionaries, said plurality of references for the level B being equal to the plurality of references for the level A when said plurality of references for the level B are created;

wherein the level A in said primary data structure which is a stack is pushed into the stack before the level B is pushed into the stack; and wherein said plurality of references for the level A comprise a reference in said stack to a plurality of subsequent references, and said reference in said plurality of references for the level B which is used for keeping track of dictionaries includes a reference from said stack to said plurality of subsequent references and one of said plurality of subsequent references refers to said generated dictionary.

14. A method according to claim 13, further comprising the steps of:

inputting an element at the hierarchical level B indicating that said generated dictionary is to be used during processing of the hierarchical level B;

changing one of said plurality of references for the level B which refers to dictionaries to be used during processing of said hierarchical level B to refer to said generated dictionary;

inputting an element at said hierarchical level B containing a key; and looking up said key in said generated dictionary and determining the value corresponding thereto using said reference which refers to dictionaries to be used during processing of said hierarchical level B.

15. A method according to claim 13, further comprising the steps of:

inputting an element at the hierarchical level B indicating a second dictionary is to be generated and generating said dictionary; and changing the reference used for keeping track of dictionaries at the hierarchical level B to refer to said second generated dictionary.

16. A method according to claim 13, further comprising the steps of:

inputting an element at the hierarchical level B indicating a second dictionary is to be generated and generating said second dictionary; and changing the reference used for keeping track of dictionaries at the hierarchical level B to refer first to said second generated dictionary and refer second to said first generated dictionary.

17. A method according to claim 16, further comprising the steps of:

finishing processing of said hierarchical level B and deleting said plurality of references for the level B in said primary data structure; and using said plurality of references for the level A when processing at the hierarchical level A, after the deleting of said plurality of references for the level B.

18. A method according to claim 13, further comprising the step of:

creating a dictionary generator data structure which contains information about said generated dictionary, after inputting the element at the hierarchical level A indicating a dictionary is to be generated;

wherein said one of said plurality of subsequent references which refers to said generated dictionary refers to said dictionary generator data structure which contains information about said generated dictionary and includes a reference to said generated dictionary.

19. A method according to claim 13, further comprising the steps of:

inputting an element at the hierarchical level B indicating a dictionary is to be generated and generating said dictionary; and changing the reference used for keeping track of dictionaries at the hierarchical level B to refer first to the generated dictionary at the hierarchical level B and subsequently to the generated dictionary at the hierarchical level A.

20. An apparatus for processing a hierarchically structured page description language document, comprising:

means for creating a primary data structure which is a stack, wherein each hierarchical level of the document has a corresponding level in the stack;

means for inputting an element indicating a beginning of a hierarchical level A of the document;

means for creating a plurality of references for a level A in said primary data structure, said plurality of references for the level A being used to keep track of parameters of the hierarchical level A of said document including a reference used for keeping track of dictionaries which are used during processing of the document, said dictionaries including key-value pairs;

means for inputting an element at the hierarchical level A indicating a dictionary is to be generated and generating said dictionary;

means for changing the reference used for keeping track of dictionaries to refer to said generated dictionary;

means for inputting an element indicating a beginning of a hierarchical level B of the document which is below the hierarchical level A in the hierarchical structure of the document; and means for creating a plurality of references for a level B in said primary data structure, said plurality of references for the level B being used to keep track of parameters of the hierarchical level B of said document including a reference used for keeping track of generated dictionaries, said plurality of references for the level B being equal to the plurality of references for the level A when said plurality of references for the level B are created;

wherein the level A in said primary data structure which is a stack is pushed into the stack before the level B is pushed into the stack; and wherein said plurality of references for the level A comprise a reference in said stack to a plurality of subsequent references, and said reference in said plurality of references for the level A which is used for keeping track of dictionaries includes a reference from said stack to said plurality of subsequent references and one of said plurality of subsequent references refers to said generated dictionary.

21. An apparatus according to claim 20, further comprising:

means for inputting an element at the hierarchical level B indicating that said generated dictionary is to be used during processing of the hierarchical level B;

means for changing one of said plurality of references for the level B which refers to dictionaries to be used during processing of said hierarchical level B to refer to said generated dictionary;

means for inputting an element at said hierarchical level B containing a key; and means for looking up said key in said generated dictionary and determining the value corresponding thereto using said reference which refers to dictionaries to be used during processing of said hierarchical level B.

22. An apparatus according to claim 20, further comprising:

means for inputting an element at the hierarchical level B indicating a second dictionary is to be generated and generating said dictionary; and means for changing the reference used for keeping track of dictionaries at the hierarchical level B to refer to said second generated dictionary.

23. An apparatus according to claim 20, further comprising:

means for inputting an element at the hierarchical level B indicating a second dictionary is to be generated and generating said second dictionary; and means for changing the reference used for keeping track of dictionaries at the hierarchical level B to refer first to said second generated dictionary and refer second to said first generated dictionary.

24. An apparatus according to claim 23, further comprising:

means for finishing processing of said hierarchical level B and deleting said plurality of references for the level B in said primary data structure; and means for using said plurality of references for the level A when processing at the hierarchical level A, after the deleting of said plurality of references for the level B.

25. An apparatus according to claim 20, further comprising:

means for creating a dictionary generator data structure which contains information about said generated dictionary, after inputting the element at the hierarchical level A indicating a dictionary is to be generated;

wherein said one of said plurality of subsequent references which refers to said generated dictionary refers to said dictionary generator data structure which contains information about said generated dictionary and includes a reference to said generated dictionary.

26. An apparatus according to claim 20, further comprising:

means for inputting an element at the hierarchical level B indicating a dictionary is to be generated and generating said dictionary; and means for changing the reference used for keeping track of dictionaries at the hierarchical level B to refer first to the generated dictionary at the hierarchical level B and subsequently to the generated dictionary at the hierarchical level A.

* * * * *